United States Patent [19]
Neville

[11] Patent Number: 6,135,174
[45] Date of Patent: Oct. 24, 2000

[54] LATHE CUTTER AND CHIP FAN

[75] Inventor: Richard L. Neville, Victor, Mont.

[73] Assignee: Nevilog, Inc., Victor, Mont.

[21] Appl. No.: 09/310,380

[22] Filed: May 12, 1999

[51] Int. Cl.[7] .................................................. B27C 7/00
[52] U.S. Cl. ................................ 144/4; 142/32; 144/2.1; 144/208.8; 241/55
[58] Field of Search .................. 142/31, 32; 144/2.1, 144/4, 208.1, 208.8; 414/14, 18; 241/55

[56] References Cited

U.S. PATENT DOCUMENTS

| | | | |
|---|---|---|---|
| 121,878 | 12/1871 | Lawrence . | |
| 607,037 | 7/1898 | Harris . | |
| 2,802,494 | 8/1957 | Nicholson | 144/134 |
| 4,303,111 | 12/1981 | Neville | 144/2.1 |
| 4,467,848 | 8/1984 | Schmid | 144/4 |
| 4,519,429 | 5/1985 | Dreese | 144/3.1 |
| 5,707,017 | 1/1998 | Paolucci et al. | 241/55 |
| 6,039,094 | 3/2000 | Neville | 144/4 |

Primary Examiner—W. Donald Bray
Attorney, Agent, or Firm—Wells, St. John, Roberts, Gregory & Matkin, P.S.

[57] ABSTRACT

A lathe cutter and chip fan is described in which an annular frame includes a rotary portion that is driven to rotate about an axis. The rotary portion is annular, forming a workpiece receiving opening. A cutter is mounted on the rotary portion and projects into the workpiece receiving opening. The cutter rotates with the rotary portion to cut material from a workpiece positioned within the workpiece opening. A housing forms a compartment about the rotary portion and cutter, with a central housing opening substantially aligned with the workpiece receiving opening. A chip discharge openly communicates with the compartment and is situated substantially tangentially with respect to a rotational path of the cutter. A plurality of impellers are mounted to the rotary portion for rotation therewith. The impellers are configured to produce an airflow through the housing with intake air entering through the central housing opening and discharging through the chip discharge, whereby chips of workpiece material removed from the workpiece by the cutter may be discharged in the airflow through the chip discharge.

15 Claims, 3 Drawing Sheets

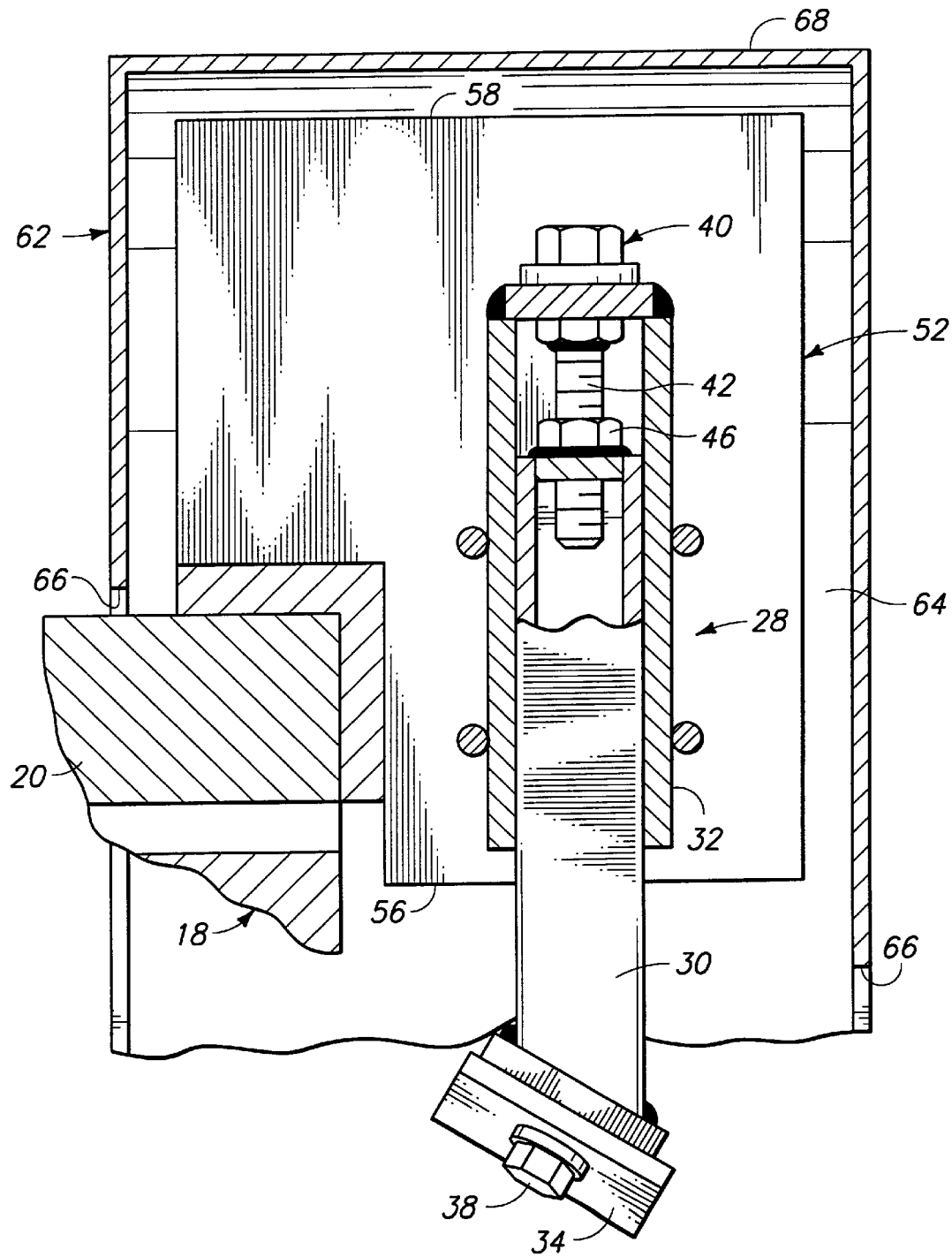
_Fig. 3_

LATHE CUTTER AND CHIP FAN

TECHNICAL FIELD

The present invention relates to cutting a workpiece such as a log into a circular cross-sectional configuration while simultaneously discharging chips of material removed from the workpiece.

BACKGROUND OF THE INVENTION

Log shaping operations are known for lathe turning logs into relatively uniform circular cross sections. In a conventional method, logs are delivered in an axial direction through a cutter head that rotates about an axis. Cutters mounted within the cutter head are rotated about the axis and against the log to progressively remove material from the log as it is moved along. Large volumes of chips are removed during this operation. Chip removal is typically accomplished using a high volume, high pressure vacuum system connected by duct work to an intake housing situated adjacent the cutter head.

Chip collection vacuum systems are expensive, require a significant amount of power, and require periodic maintenance and repair work. A need thus arises for a simple chip exhaust system.

This need is filled by the present lathe cutter and chip fan in which the cutter and exhaust are combined in a single unit in which cutters and impellers are mounted to a common rotary portion of a frame. The cutters rotate about the workpiece, removing material in the form of chips. The impellers are mounted to the same rotary portion and therefor operate simultaneously with the cutters to produce an airflow that is effective to carry the chips in an airstream through a discharge and away from the cutters.

An objective of the present invention is thus to provide such a lathe cutter and chip fan whereby the same rotary motion of the cutter is used to produce a discharge airstream without requiring a chip removal vacuum system.

The above and still further objects and advantages will be understood from the following description which, taken with the accompanying drawings, describe preferred forms of the present invention.

BRIEF DESCRIPTION OF THE DRAWINGS

Preferred embodiments of the invention are described below with reference to the following accompanying drawings.

FIG. 3 is an enlarged sectional view taken substantially along line 3—3 in FIG. 2.

DETAILED DESCRIPTION OF THE PREFERRED EMBODIMENTS

Figure 1:
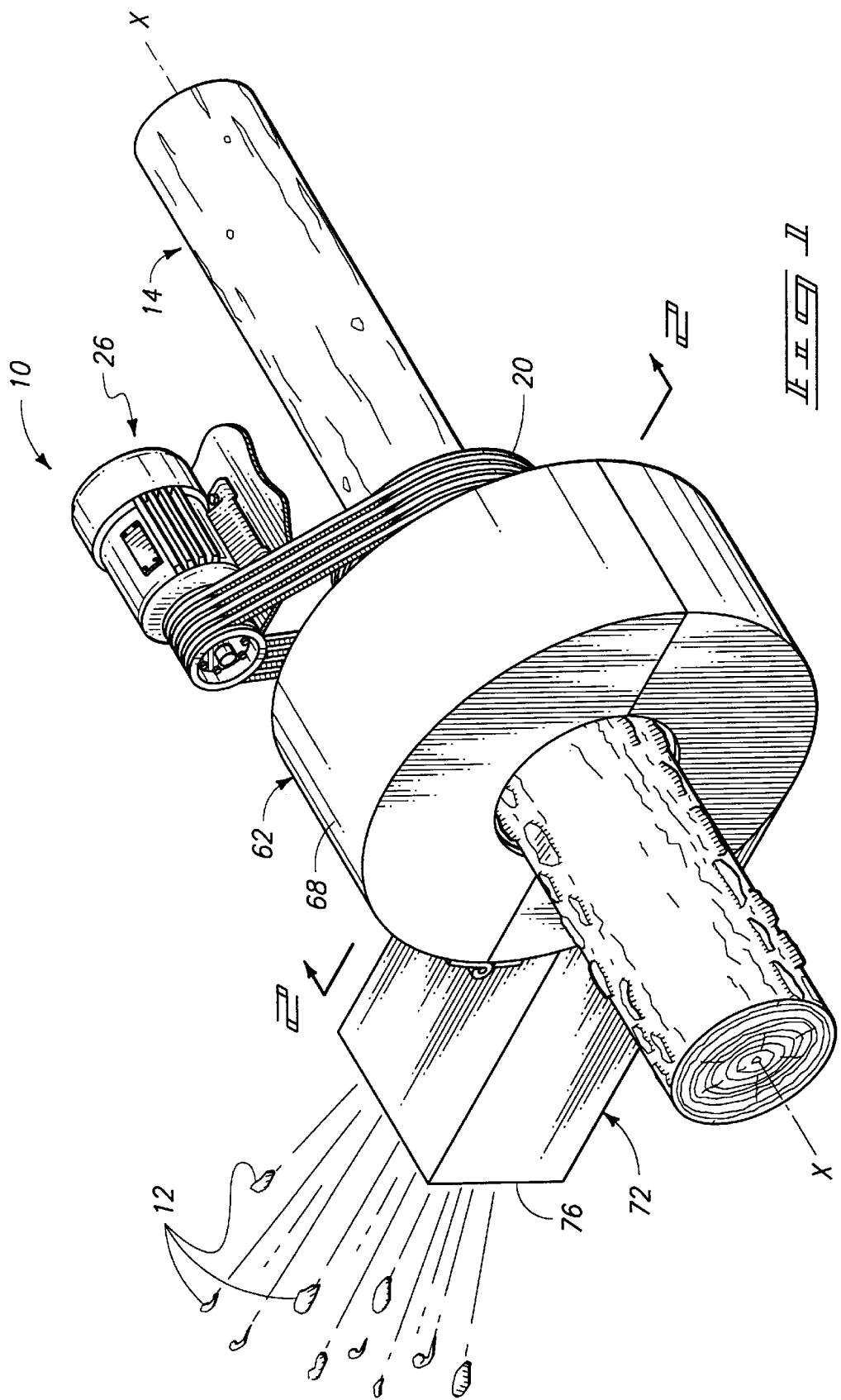
FIG. 1 is a perspective diagrammatic view illustrating a preferred form of the present invention in operation.

This disclosure of the invention is submitted in furtherance of the constitutional purposes of the U.S. Patent Laws "to promote the progress of science and useful arts" (Article 1, Section 8).

An example of a preferred form of the present lathe cutter and chip fan is generally shown at 10 in the drawings. The lathe cutter and chip fan 10 is provided primarily for the purpose of cutting and removing chips 12 (FIG. 1) from workpieces 14 such as logs or cants to produce finished logs of circular cross section.

The workpiece 14 is moved along an axis X through the present machine and is held against rotation while cutters and chip fan impellers rotate. As the workpiece advances, rotating cutters engage and cut the workpiece to a prescribed diameter. The cutting action produces chips that are removed and discharged from the area in an airstream produced by the simultaneously rotating impellers.

Figure 2:
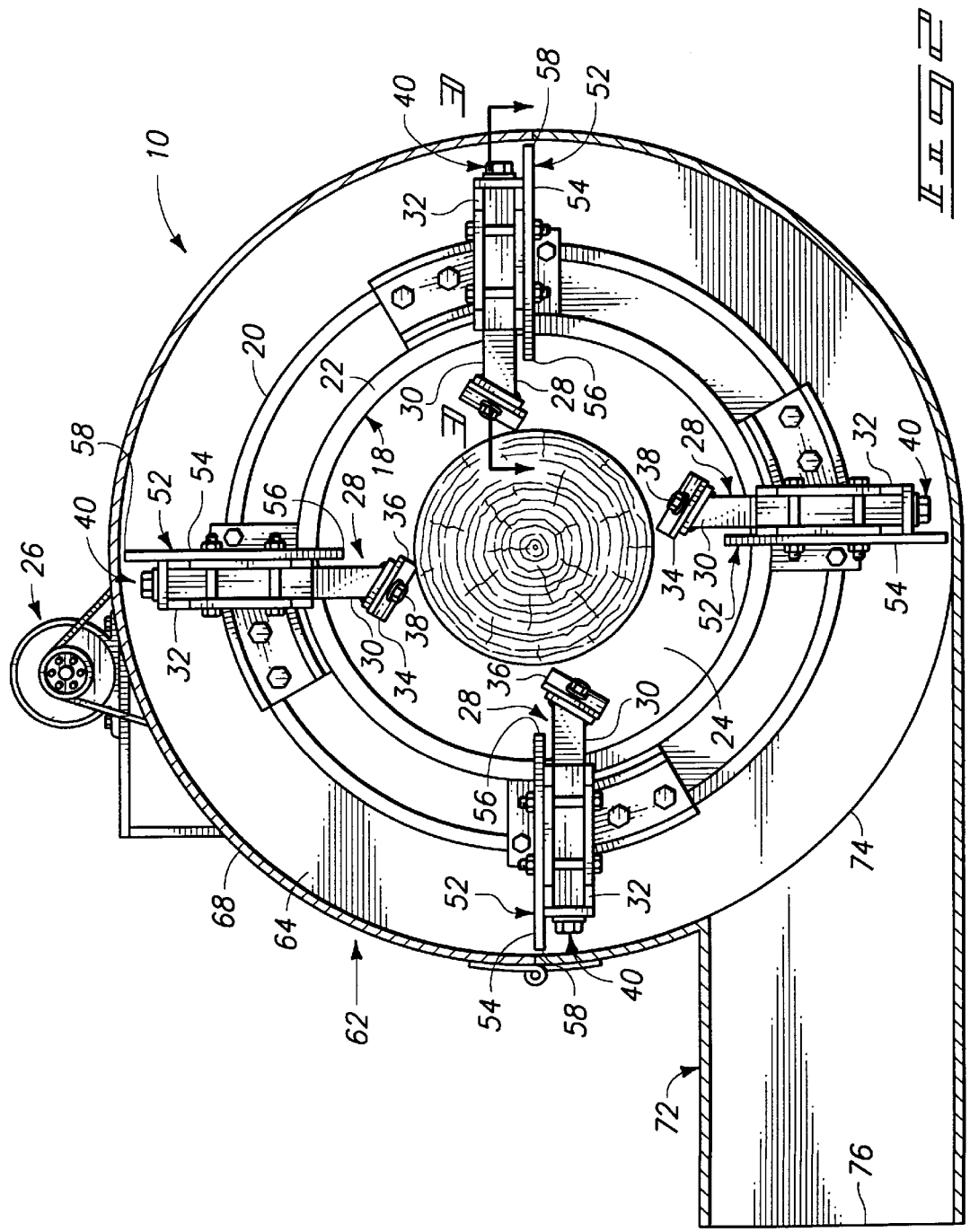
FIG. 2 is a sectional view taken substantially along line 2—2 in FIG. 1.

Looking in greater detail to the drawings, an annular frame 18 (FIG. 2) is shown having a rotary portion 20 driven to rotate about axis X in a direction of rotation (clockwise in FIG. 2). A drive assembly 26 (FIG. 1) is provided for this purpose.

The frame 18 and rotary portion 20 are annular and configured to receive a workpiece or log fed along the axis X. Frames and rotary portions similar to the above are known in the log turning industry and need not be described in detail herein. For example, U.S. Pat. Nos. 4,303,111 to the present Applicant, Richard L. Neville ; and 4,519,429 to Dreese are exemplary of annular frames mounting annular rotated cutter mounting parts. Portions of these patents related to the annular frame and cutter mounting rotary portions thereof are hereby incorporated by reference. Further, the incorporated Neville patent also shows a feed mechanism used for supporting and delivering successive workpieces through a cutter. The present invention may be utilized with this or other appropriate feed mechanisms capable of delivering and feeding an elongated workpiece such as a log or cant along a prescribed longitudinal path through the present cutter and chip fan 10.

As shown in FIG. 2, the frame 18 includes an annular stationary part 22 that may be held in a fixed position by an appropriate support structure (not shown). The stationary part 22 rotatably supports the rotary portion 20 which may be driven to rotate by the drive assembly 26. In the example illustrated, the drive assembly 26 is an electric motor and belt assembly drivingly connected to the rotary portion 20. Another drive mechanism such as an appropriate hydraulic motor could be used. Further, a different driving linkage such as a conventional chain and sprocket drive could be used. Appropriate gearing could also be used.

The frame 18 and rotary portion 20 define a workpiece opening 24 through which the workpiece may be fed. The opening 24 is selected to be larger than the largest diameter (or cross-section) workpiece. Also, the opening 24 is most preferably centered on the axis X.

In preferred embodiments, at least one and more preferably a number of cutters 28 are mounted to the rotary portion 20. The cutters 28 project into the workpiece receiving opening 24, and are configured to rotate with the rotary portion 20 and cut material from a workpiece positioned within the workpiece opening 24.

Each of the cutters 28 (FIG. 3) advantageously includes a post 30 that is adjustably mounted for substantially radial adjustment in an guide member 32. The guide member 32 is substantially securely mounted to the rotary portion 20 of the frame. A cutting blade 34 is releasably mounted at a radial inward end of the post 30. Mounting bolts 38 permit removal and re-sharpening of the cutter edge 36 (FIG. 2). The mounting bolts 38 and post end orient the cutter edge at a preferred angle to enable the cutter edge to slice through the workpiece as the cutter is rotated.

A preferred adjuster 40 is provided for each cutter, connecting the associated guide member 32 and post 30 to facilitate substantial radial adjustment of the cutter edge 36 toward or away from the workpiece 14. The adjuster 40 is preferably comprised of a bolt 42 captured against axial movement but freely rotatable in relation to the guide member (see FIG. 3). The bolt shank threadably engages a nut 46 that is welded or otherwise secured to the adjacent post end such that rotation of the bolt will result in movement of the post and cutter blade.

It is pointed out that several cutters 28 as described above are provided. The preferred cutters are equi-angularly spaced about the rotary portion 20 as shown in FIG. 2. In the configuration example illustrated, four cutters 28 are mounted to the rotary portion 20 in diametric opposition. It is possible, however that more or fewer cutters be used, but it remains desirable that they be equi-angularly spaced for balance and even application of torque through the rotary portion 20.

In preferred forms, the cutting blades 34 are positioned at differing radial positions in relation to the workpiece such that the workpiece will be progressively cut to a desired diameter. This may be selectively accomplished by operation of the adjusters 40.

A plurality of impellers 52 are mounted to the rotary portion 20 for rotation therewith. Each impeller 52 is configured to produce an airflow to carry and discharge chips 12.

It is preferable that the impellers 52 each include a planar working surface 54 that is substantially radially oriented with respect to the axis X. It is also preferable that an impeller be mounted to each of the guide members 32, separately from the posts 30. Adjustment of the cutters is thus an operation separate from the impellers. That is to say the impellers are not necessarily radially adjustable with the cutting blades.

Each preferred impeller extends substantially radially from an inside edge 56 to an outside edge 58. The inside edges 56 are radially outwardly adjacent the cutting blades 34, and the outside edges 58 are situated closely adjacent to a housing to be described below.

The planar working surfaces 54 extend between the edges 56, 68 and lie within substantially radial planes that are adjacent to the cutting edges with respect to the direction of rotation as shown by FIG. 2. This places the impellers forwardly of (with respect to the rotational direction) and directly adjacent to the respective guide members 32. In preferred forms, the impellers are bolted to the guide members 32. The working surfaces of the impellers will thus protect the guide members 32 and adjusters 40 from clogging with chips during operation.

A housing 62 forms a compartment 64 about the rotary portion 20 and cutters 28. The housing includes a central housing openings 66 that are substantially aligned axially with the workpiece receiving opening 24.

In preferred forms, the housing is substantially circular and centered on the axis X. It includes a substantially circular outer wall 68 that is situated slightly outward of the outside impeller edges 58, and transverse end walls 70 that are axially adjacent radial edges of the impellers and define the openings 66. The housing thus substantially encases the cutters 28 and the impellers 52.

A chip discharge 72 openly communicates with the compartment 64 and is situated substantially tangentially with respect to the rotational path of the cutters 28. Assuming a clockwise rotational direction of the cutters 28 and impellers, an open intake end 74 of the discharge 72 is positioned in the lower left quadrant of the housing as shown in FIG. 2, opening into the compartment. This position is preferred to take advantage of gravity since chips will naturally tend to fall from the workpiece. If, on the other hand, the orientation of the cutters and impellers were reversed, and if the rotary portion were driven in a counter clock-wise direction, the chip discharge would most preferably be situated in the lower right quadrant of the housing.

The discharge 72 leads from the intake end 74 to an exhaust end 76 that is shown in FIG. 1 discharging chips 12. However it may well be desirable to connect the exhaust end 76 to conventional ducting (not shown) that will lead away to a chip collection area (not shown).

The cutters 28, impellers 52 and rotary portion 20 of the frame are free to rotate together within the housing 62. Such rotation is assumed to be in a clockwise direction as viewed in FIG. 2, and is preferably within a range of about 150 and 300 RPM. Rotational speeds within this range may be selected according to the size and consistency of the workpiece, and the workpiece feed rate. For cutting soft woods such as spruce and fir, an rpm range of between 200 and 250 has been found effective.

With the present combination cutter and fan arrangement, the rotational speed may be determined by the material being cut and the feed rate, not by airstream requirements for chip removal. It has been found that with the described impeller and housing arrangement, the present rotational speed range is sufficient to facilitate a smooth cutting operation and to simultaneously create enough airflow to remove chips from the cutting area. Chips of workpiece material removed from the workpiece by the cutter may be thus be removed and discharged in the airflow through the chip discharge, all in response to rotation of the rotary portion 20 of the frame; and thus all in response to operation of a single drive source 26.

Prior to operation, the cutters are adjusted to cut a workpiece to a desired diameter. This is done using the adjusters 40, preferably in a manner such that the cutters will take progressively deeper cuts in the workpiece as they are rotated. Thus it may be that only one of the cutters is set to the final diameter and the remaining three are set to progressively larger diameters. Once the adjustments are made, the drive 26 is activated to start the cutters 28 and impellers 52 rotating.

In operation, a workpiece 14 is fed by existing conveying mechanisms (not shown) along the axis X and through the axially aligned workpiece opening 24 and housing opening 66. The cutters, now rotating at a rate between 150 and 300 rpm begin to engage and progressively cut the workpiece to the prescribed diameter.

Each cutter will dislodge chips from the workpiece. At least a portion of the dislodged chips from each cutter will pass under the radially adjacent impeller 52 and strike the following impeller. This impeller will cause the chips to move radially outwardly due to centrifugal force. Further, the rotating impellers will create a substantial airflow, with intake air being drawn into the housing 62 through the housing openings 66. The in-rushing air will carry chips outwardly toward the outer wall 68 of the housing, and in an expanding circular path due to the rotating impellers 52. Finally the chips, traveling at high velocity in the air current will be discharged through the chip discharge 72. The outwardly guided chips may be carried by the exhausting airstream to a remote collection site, simply by force of the air current created by the impellers.

It is noted that the chip cutting and exhaust functions are accomplished using the same drive. There is no need for auxiliary chip vacuum systems because the present lathe cutter and chip fan 10 functions well to complete both cutting and chip removal functions. The result is a substantial savings in equipment, maintenance and repair.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A lathe cutter and chip fan, comprising:

an annular frame having a rotary portion driven to rotate about an axis in a direction of rotation and forming a workpiece receiving opening;

a cutter on the rotary portion projecting into the workpiece receiving opening, configured to rotate with the rotary portion and to cut material from a workpiece positioned within the workpiece opening;

a housing forming a compartment about the rotary portion and cutter, and including a central housing opening substantially aligned with the workpiece receiving opening;

a chip discharge openly communicating with the compartment and situated substantially tangentially with respect to a rotational path of the cutter; and a plurality of impellers mounted to the rotary portion for rotation therewith and configured to produce an airflow through the housing with intake air entering through the central housing opening and discharging through the chip discharge;

whereby chips of workpiece material removed from the workpiece by the cutter may be discharged in the airflow through the chip discharge.

2. A lathe cutter and chip fan as defined by claim 1, wherein there are an equal number of cutters and impellers.

3. A lathe cutter and chip fan as defined by claim 1, wherein the impellers each include a substantially planar surface facing the direction of rotation.

4. A lathe cutter and chip fan as defined by claim 1, wherein the cutter and impellers are driven to rotate within a range of approximately 150 to 300 rpm.

5. A lathe cutter and chip fan as defined by claim 1, wherein there are a plurality of cutters and wherein the impellers are mounted to the cutters.

6. A lathe cutter and chip fan as defined by claim 1, wherein there are a plurality of cutters and wherein the impellers are mounted to the cutters and the impellers are substantially radially oriented with respect to the axis.

7. A lathe cutter and chip fan as defined by claim 1, wherein there are an equal number of cutters and impellers;

wherein the cutters include cutting edges; and wherein the impellers include working surfaces that are positioned in planes that are adjacent to the cutting edges with respect to the direction of rotation.

8. A lathe cutter and chip fan as defined by claim 1, wherein there are a plurality of cutters and wherein the cutters and impellers are substantially equi-angularly spaced about the axis.

9. A lathe cutter and chip fan as defined by claim 1, wherein a plurality of cutters are mounted to the rotary portion, and wherein each of the cutters is comprised of:

an approximately radially oriented guide member mounted to the rotary portion;

a post including a blade mount;

a cutting blade releasably secured to the blade mount a adjuster mounting the post to the guide member; and wherein one of the impellers is mounted to the guide member.

10. A lathe cutter and chip fan, comprising:

an annular frame having a rotary portion driven to rotate in a direction of rotation about an axis and defining a central workpiece receiving opening;

a plurality of cutters on the rotary portion projecting into the workpiece receiving opening and adjustably positionable toward the workpiece receiving opening to engage and cut material from a workpiece positioned within the workpiece opening in response to rotation of the rotary portion;

a housing forming a compartment about the rotary portion and cutters, and including a central housing opening substantially axially aligned with the workpiece receiving opening;

a chip discharge openly communicating with the compartment and situated substantially tangentially with respect to a rotational path of the cutter; and a plurality of impellers, at least some of which are mounted to the cutters for rotation therewith and configured to produce an airflow through the housing with intake air entering through the central housing opening and discharging through the chip discharge;

whereby chips of workpiece material removed from the workpiece by the cutter may be discharged in the airflow through the chip discharge.

11. A lathe cutter and chip fan as defined by claim 10 wherein the cutters include cutting edges; and wherein the impellers include working surfaces that are positioned in planes that are adjacent to the cutting edges with respect to the direction of rotation.

12. A lathe cutter and chip fan as defined by claim 10, wherein the impellers are substantially radially oriented with respect to the axis.

13. A lathe cutter and chip fan as defined by claim 10, wherein the impellers include substantially planar surfaces facing the direction of rotation.

14. A lathe cutter and chip fan as defined by claim 10, wherein the cutters and impellers are driven to rotate within a range of approximately 150 to 300 rpm.

15. A lathe cutter and chip fan, comprising:

an annular frame having a rotary portion driven to rotate in a direction of rotation about an axis and forming a central workpiece receiving opening;

cutters substantially equi-angularly spaced about the axis and including cutting edges adjustably positionable with respect to the axis for selective adjustment toward and away from the axis;

the cutters being mounted to rotate with the rotary portion and to cut material from a workpiece positioned within the workpiece opening;

a housing forming an annular compartment about the rotary portion and cutter, and including a central housing opening in substantial axial alignment with the workpiece receiving opening;

a chip discharge openly communicating with the compartment and situated substantially tangentially with respect to a rotational path of the cutters;

a plurality of impellers mounted to the rotary portion and spaced substantially equi-angularly about the axis for rotation with the rotary portion and configured to produce an airflow through the housing with intake air entering through the central housing opening and discharging through the chip discharge;

wherein the cutters and impellers are driven to rotate within a range of approximately 150 to 300 rpm;

whereby chips of workpiece material removed from the workpiece by the cutter may be discharged in the airstream through the chip discharge.

* * * * *